INVENTOR.
WILBUR D. PRICER
BY [signature]
ATTORNEY

United States Patent Office 3,492,661
Patented Jan. 27, 1970

3,492,661

MONOLITHIC ASSOCIATIVE MEMORY CELL

Wilbur D. Pricer, Pleasant Valley, N.Y., assignor to International Business Machines Corporation, Armonk, N.Y., a corporation of New York Filed Dec. 17, 1965, Ser. No. 514,568
Int. Cl. G11b 11/00, 13/00
U.S. Cl. 340—173 6 Claims

ABSTRACT OF THE DISCLOSURE

A memory cell adapted to be formed by monolithic integrated circuit techniques, and a memory system incorporating a plurality of such cells. Each cell is constituted of at least a pair of transistors or like devices. The system is uniquely capable of associative memory operation according to which a match or mismatch is determined by activating a signal source connected to the first terminal of one of the devices in said cell or by activating another signal source connected to the first terminal of the other device in said cell, and further, by sensing variation in current flow by a sensing means connected in common to a third terminal of both of said devices.

This invention relates to a memory or storage device and more particularly to a memory cell adapted for use in an associative memory system.

Memory systems can be classified by the manner in which selected discrete locations may be interrogated in order to perform read and write operations. Examples of such memory systems include those having addresses identified with the physical location of the unit of data and one such form of memory system is the coordinate address memory system in which groups of selection lines are arranged in such a manner that energization of particular lines in each group is effected to select a unique word location.

Associative memory systems, with which the present invention is concerned, although not limited thereto, are those in which a unit of data, such as a word, is located and selected by specifying the information content of an arbitrary portion of its structure. Whether one retrieves or modifies such unit of data is determined by an appropriate instruction. The associative region may extend over the entire word or only a portion thereof. One of the basic operations in an associative memory system involves interrogating a vast storehouse of information in the form of data words stored in a tremendous number of memory cells. This storehouse of information is thus searched in order to determine whether a particular data word is contained within the memory system. This is conveniently done by comparing the information stored in an interrogation register with the information contained in the particular data words stored in memory. Provisions are normally incorporated, upon finding a "match," to read the word out of memory.

Many different proposals have been made for associative memory systems and in order to provide background material reference may be had to the following: "Associative Memory With Retrieval" by Seeber et al.—IBM Journal 1962; "A Cryotron Catalog Memory System," A. D. Slade and H. O. McMahon. Proceedings of the Eastern Joint Computer Conference, December 1956; "Thin Film Cryotron Catalog Memory," A. E. Slade and C. R. Smallman. Symposium on Superconductive Techniques for Computing Systems, May 1960; "A Magnetic Associative Memory," J. R. Kiseda, H. E. Petersen, W. C. Seelbach and M. Tcig. IBM Journal 5, No. 2196 (1961); "Cryogenic Associative Memory," R. R. Seeber, presented at National Conference of the Association for Computing Machinery, Milwaukee, August 1960; "Associative Self Sorting Memory," R. R. Seeber, presented at Eastern Joint Computer Conference, December 1960.

These previously proposed associative memory systems rely on implementation by the use of magnetic elements, usually magnetic cores or thin films, or cryogenic elements.

Although semiconductor devices such as transistors have been used extensively in various types of electronic circuits because of their well-known advantages of small size, low power losses, sturdiness, etc., they have not been found to be cheap enough, in terms of cost per bit of information that is to be stored, for adaptation generally to memory systems and, in particular to associative memory systems. As noted previously, such associative memory systems require vast numbers of memory cells for storage of data information, which, realistically, requires great packing density on the order of many thousands of devices per square inch. However, it is not simply a question of packing large numbers of these memory cells into a given volume of material since there arises the matter of the interconnections to the many thousands of such devices, and the circuitry must be simple enough that the interconnection problem does not defeat the fulfillment of the inherent capability of present day monolithic techniques.

The present invention provides a memory cell that is uniquely adapted to be fabricated in monolithic form, and a memory system which, because of the simplicity of construction of the individual memory cells, enables full exploitation of the capability of monolithic techniques. By monolithic is meant that type of integrated semiconductor circuitry wherein the required number of devices, on the order of thousands per square inch, are contained in a block or monolith of semiconductor material. Such huge assemblies of devices are conventionally realized today by the diffusion technology by which discrete devices are formed by impurity diffusion through a mask into the monolith and are, by one means or another, electrically isolated. Interconnection patterns, which allow for connecting up a plurality of devices in suitable electrical circuit configurations, are normally provided on the top surface of the semiconductor monolith. Again, it must be emphasized that the interconnection patterns must be simple enough so as not to restrict severely the gains achievable by the extremely close packing of devices that is possible with monolithic techniques.

It is a primary object of the present invention to provide a simply constructed memory cell readily implemented by monolithic techniques of device fabrication.

Another object is to realize the full capability of monolithic techniques in forming associative memory arrays or systems.

A further object is to provide a memory cell from which information may be read out nondestructively.

Yet another object is to provide an associative memory system in which information may be written in to various bit positons and read out from associated bit positions simultaneously.

A further object is to provide a memory cell adapted for use in associative memory applications involving extremely high speed operations on the order of tens of nanoseconds.

In accordance with a broad feature of the present invention, a memory cell is constructed by employing as few as two transistors and three resistors using direct coupling between transistors in what is, effectively, a bistable latch. The terms "directly coupled" or "directly connected" when used with respect to transistor circuitry refer to the fact there is no impedance element present in the connecting link from one point to another. Thus, considering a bistable latch or flip-flop wherein cross coupling is employed from the collectors on each side of the latch to the bases of the opposite transistors, this may be done by direct coupling not involving any impedance elements such as resistance and capacitance in the feedback path.

Further advantages of the associative memory cell of the present invention are: (1) information may be written into selected bits of selected words without disturbing other bits of the same words and (2) only monopolar drive pulses are used.

Briefly considered, the memory cell of the present invention is embodied in a circuit which basically comprises a bistable latch with the inputs to each side of the latch serving as the "bit lines" and with a common emitter resistance serving as the "word line." Means are provided to the several lines for reading out the stored information nondestructively in either a conventional or associative read out operation.

In order to write in information, for example, to write in a "1," the selected "word line" and the "bit test 0" line have their potentials raised, that is, are pulsed positively. The positive pulsing of the word line reduces the current flowing in the conductive transistor and sensitizes the memory cell for a change in state. Then, because of the more positive potential at the base electrode of one transistor, that transistor will conduct and this conduction state is maintained due to the bistable characteristic of the circuit. Stored information is read out nondestructively by raising the potential only on the "word line," causing the current through the already conducting transistor to vary, which variation is then sensed.

In the operation of the circuit to perform an associative search, only the test lines, that is the "bit test 0" and the "bit test 1" lines, have their potential levels changed. In this case, the word line acts as the sense line and has sense amplifiers connected to it. Each sense amplifier is connected to a latch which is initially set, e.g. to the "1" state as a "flag." If it is assumed that the cell is to be tested for a stored "0," the bit test "0" line is raised in potential. If instead of a "0" being stored, a "1" is being stored with a first transistor then being conductive, the raising of the potential of the "bit test 0" line causes a spike of current or voltage to appear on the word line. This resets the output latch and disqualifies this particular bit position. However, if the other transistor in the latch is conducting, the raising of the collector potential has no effect on the word line, and the flag latch remains up, thereby indicating a stored "0" in the memory cell.

The foregoing and other objects, features and advantages of the invention will be apparent from the following more particular description of preferred embodiments of the invention, as illustrated in the accompanying drawings.

Figures 1, 2:
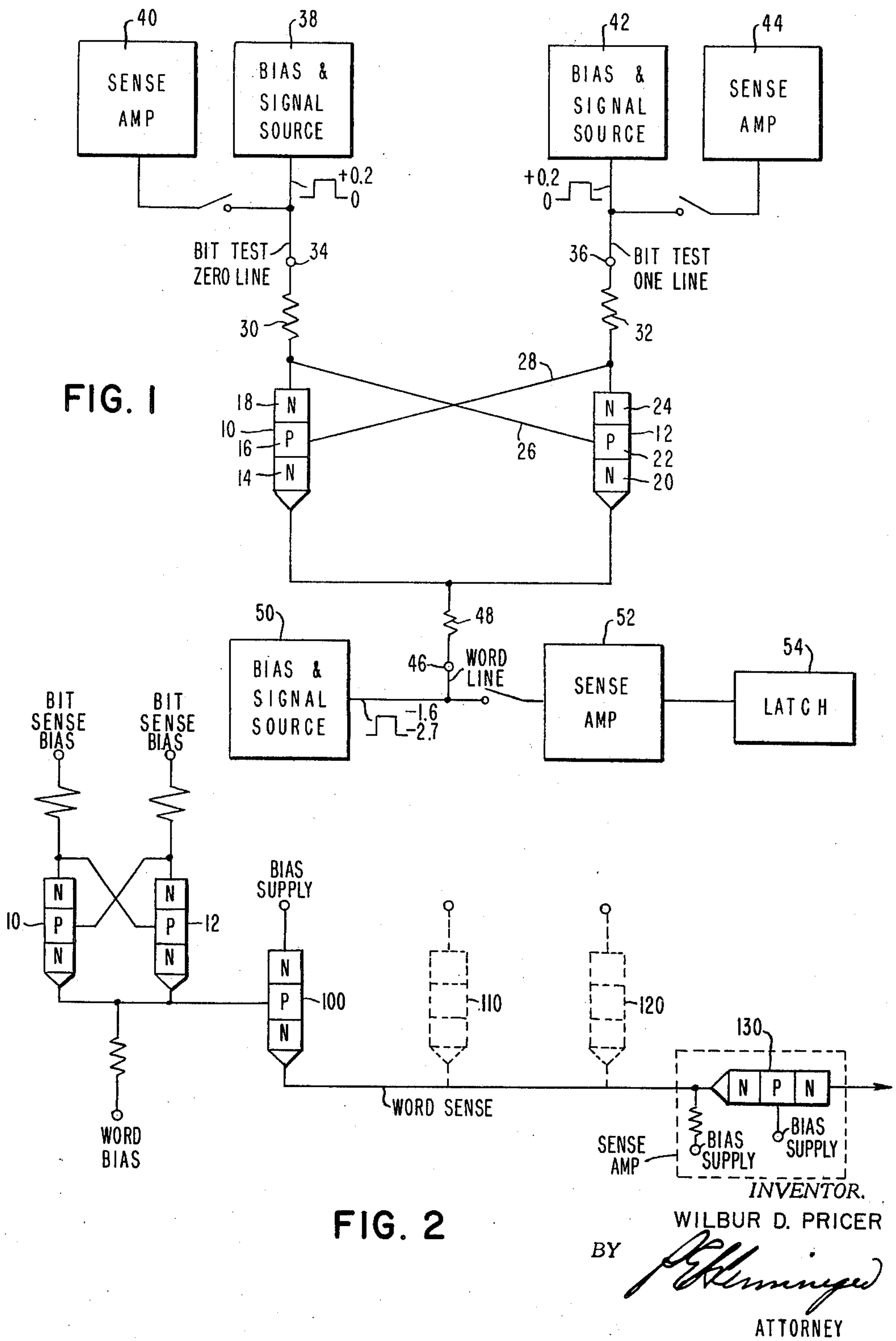
FIG. 1 is a schematic circuit diagram, partly in block form, of one arrangement of a memory cell in accordance with the present invention.
FIG. 2 is a schematic diagram of an alternative memory cell in accordance with the present invention.

Referring first to FIG. 1, a first transistor 10 and a second transistor 12 are provided, typically of the n-p-n type. Each of these transistors is provided with conventional emitter, base, and collector regions, designated 14, 16 and 18 respectively, for transistor 10, and 20, 22 and 24 for transistor 12. The bases of transistors 10 and 12 are respectively coupled directly to the collectors of the opposite transistors. Thus, the base 16 of transistor 10 is connected by lead 26 to the collector 24 of transistor 12, and correspondingly the base 22 of transistor 12 is connected by lead 28 to the collector 18 of transistor 10. Each of the collectors 18 and 24 is connected through a suitable current limiting load resistor 30 and 32, respectively, and thence to respective terminals 34 and 36. From terminals 34 leads are provided to connect to bias and signal source 38 and when desired by a suitable switching arrangement to sense amplifier 40. Likewise, from the terminal 36 leads are provided for connecting the bias or signal source 42 and to sense amplifier 44. For convenience, the line to the collector 18 is referred to as the "bit test 0" line, and the line to the collector 24 as the "bit test 1" line.

The emitters 14 and 20 of transistors 10 and 12, respectively, are coupled together and are connected by suitable leads to the terminal 46 through emitter resistor 48. From terminal 46, connections are made to bias and signal source 50 and to sense amplifier 52.

It will be appreciated that the portion of the circuit of FIG. 1 bounded by the upper terminals 34, 36 and lower terminal 46 is available for ready implementation in monolithic form. Thus, the two transistors may be created in the monolith or block of semiconductive material by selective diffusion of the respective emitter, base, and collector regions. Likewise, the load resistors and the cross connections may also be produced within the monolith by techniques well known in the art. The only requirement to realize the entire circuit configuration of FIG. 1 is to produce on the top surface of the monolith the required lines for communication to the imbedded elements.

For illustrative purposes, the sources 38, 42 and 50 are schematically shown as combined bias and signal sources, but it will be appreciated that separate sources of quiescent or D.C. bias could be employed. Typical values of potential for the quiescent and dynamic conditions on the several lines are indicated next to the pulse forms adjacent the sources 38, 42 and 50 in FIG. 1.

Considering now the operation of the memory cell circuit of FIG. 1, in the quiescent state, that is, when no pulses from the signal sources are being applied, either the transistor 10 or the transistor 12 is in the conductive state. When transistor 10 is conductive, it is considered that a "0" is being stored, and when transistor 12 is conductive, a "1" is being stored. With the cross-coupling or regenerative feedback arrangement provided by the leads 26 and 28 from the collector of each transistor to the base of the other, the conductive transistor will keep the nonconductive transistor in that state, that is, the voltage drop through either resistor 30 or resistor 32 will be sufficient to control the conduction state of the opposite transistor. In this circuit arrangement neither transistor saturates.

Let us assume that the circuit is storing a "0," that is, transistor 10 is conductive. In this case the potential on collector 18 of transistor 10 is typically on the order of −400 millivolts and this potential applied to the base 22 of transistor 12 is sufficient to keep transistor 12 in the nonconductive state. Similarly, the nonconductive transistor 12 has its collector potential close to ground, which when applied through lead 28 to base 16 of the conducting transistor 10 is such as to keep transistor 10 conducting.

WRITE OPERATION

In order to write information into the memory cell circuit of FIG. 1, or, into an array of similar memory cells, the word line is pulsed positively. Thus a pulse is provided from a signal source 50 to the emitters of the transistors 10 and 12. If it desired to write "0" into the memory cell of FIG. 1, the "bit test one" line is pulsed positively. Thus, a pulse is applied from the source 42 to the base 16 of transistor 10 coincidently with the pulsing of the word line. The pulse applied from the signal source 50 is ordinarily sufficient to halve the current flowing in the conductive transistor. By the application of such a pulse the memory cell is made more sensitive to a change in state. Now with a coincident pulse applied from the source 42 to the base 16 of transistor 10, this action causes transistor 10 to conduct due to the more positive potential at its base electrode 16. When transistor 10 goes into conduction, the potential at its collector 18 applied to the base 22 of transistor 12 keeps transistor 12 in the nonconductive state, even when the pulses from source 50 and source 42 are removed.

Similarly, to write a "1" the word line is again pulsed positively. However, now a pulse is applied from the source 38 on the "bit test 0" line to the base 22 of transistor 12 coincidently with the pulsing of the word line. This combined action causes transistor 12 to go into the conductive state due to the more positive potential at its base electrode. As before, the conduction state of transistor 12 renders the transistor 10 nonconductive.

In summary, the raising of the potential of the word line decreases the current in whichever of the transistors 10 or 12 is conducting and the higher base potential controls the transfer of conduction from one transistor to the other.

NONDESTRUCTIVE READ OUT

In memory systems, and particularly, associative memory systems, it is highly desirable that the storage devices may be read out in nondestructive fashion, that is, the memory cell or storage device may be interrogated in such a manner that its state need not be changed, for example, from a "1" to a "0" in order to ascertain what the cell has been storing. Rather, it is highly desirable that the state be ascertained and some indication be given of the present state, but without requiring that the state of the cell be changed.

With the memory cell of the present invention as previously described in FIG. 1, the stored information is nondestructively read out in the following way. The potential on the word line is raised by application of a pulse from source 50 and of same amplitude as described before. The application of such pulse causes current through the then conducting transistor to vary (generally to be halved). Thus, assuming transistor 10 is conducting with a "0" being stored, the change in current due to the application of a pulse only from source 50 on the word line is detected by means of sense amplifier 40 which is connected to the "bit test 0" line for this purpose. Of course, in similar manner the storage of a "1" can be detected by a change in current flowing through transistor 12 upon application of a pulse only from source 50 to the word line.

ASSOCIATIVE OPERATION

As aforenoted, the memory cell of the present invention is adapted for associative memory applications. For ease and simplicity of understanding the basic principles of the present invention only a single memory cell, as illustrated in FIG. 1 will first be considered.

When an associative search is to be performed only the test lines have their potential levels changed. To test the memory cell of FIG. 1 for a "0," a pulse of approximately 200 millivolts is applied from source 38 to the "bit test 0" line. If, in fact, the memory cell is storing a "0," transistor 10 will then be conducting, but the application of the aforesaid pulse from source 38 will not change its conducting state nor substantially affect the current flow through transistor 10. In addition, the pulse from source 38 is insufficient in magnitude to affect the input biasing of transistor 12 so that that transistor will remain nonconductive. However, if instead of a "0," a "1" is being stored, with transistor 12 then being conductive, the raise in potential on the "bit test 0" line causes a spike of current to appear on the word line, and this is detected by sense amplifier 52 which is connected to the word line for this purpose. This effect occurs because the conductive transistor 12 acts like an emitter follower through the emitter resistor to the word line. The sense amplifier 52 would, under these conditions, be connected to a latch 54 which is initially set to the "1" state as a "flag." When the spike of current appearing on the word line is detected by the sense amplifier 52 this resets the output latch 54 and disqualifies this particular bit position. In other words, a mismatch was found because, when testing for a "0," a "1" was found. However, if a match had been found the latch would have remained in its set state indicating the match or a stored "0."

It will be understood from the foregoing description that an associative search operation is similar to the previously described nondestructive read out. That is, the testing of the memory cell to determine the storing of a "0" or a "1" does not destroy the information present in the cell and thus the nondestructive character is maintained.

ALTERNATIVE EMBODIMENT OF MEMORY CELL

In FIG. 2 there is illustrated the same memory cell configuration as was shown in FIG. 1, except that here an additional transistor is used at the emitter side as a further output stage to improve the response of the basic circuit. In addition to transistor 10 and 12, a transistor 100 has its base connected to the same common emitter point as transistors 10 and 12, and its collector is connected to a suitable bias supply. The emitter of transistor 100 is connected to a sense amplifier as was the case in FIG. 1 where sense amplifier 52 was used. The transistors shown dotted, that is transistors 110 and 120, serve as like output stages for other memory cells in an array. Thus, the basic cell incorporating transistors 10 and 12 is repeated in other bit positions and the transistors 110 and 120 are added to these bit positions for the same reason that transistor 100 was used in conjunction with storage transistors 10 and 12. Since the emitters of transistors 100, 110 and 120 have their emitters tied in common, any mismatch in any bit position will be detected by the sense amplifier.

It should be noted that the addition of a third transistor to the basic circuit of the memory cell of the present invention serves to limit the cross talk "noise" from match bits. Such arrangement also has the advantage that it makes the mismatch signal to the sense amplifier uniform, irrespective of whether one or many bits mismatch the interrogated field.

ASSOCIATED MEMORY MATRIX

Figure 3:
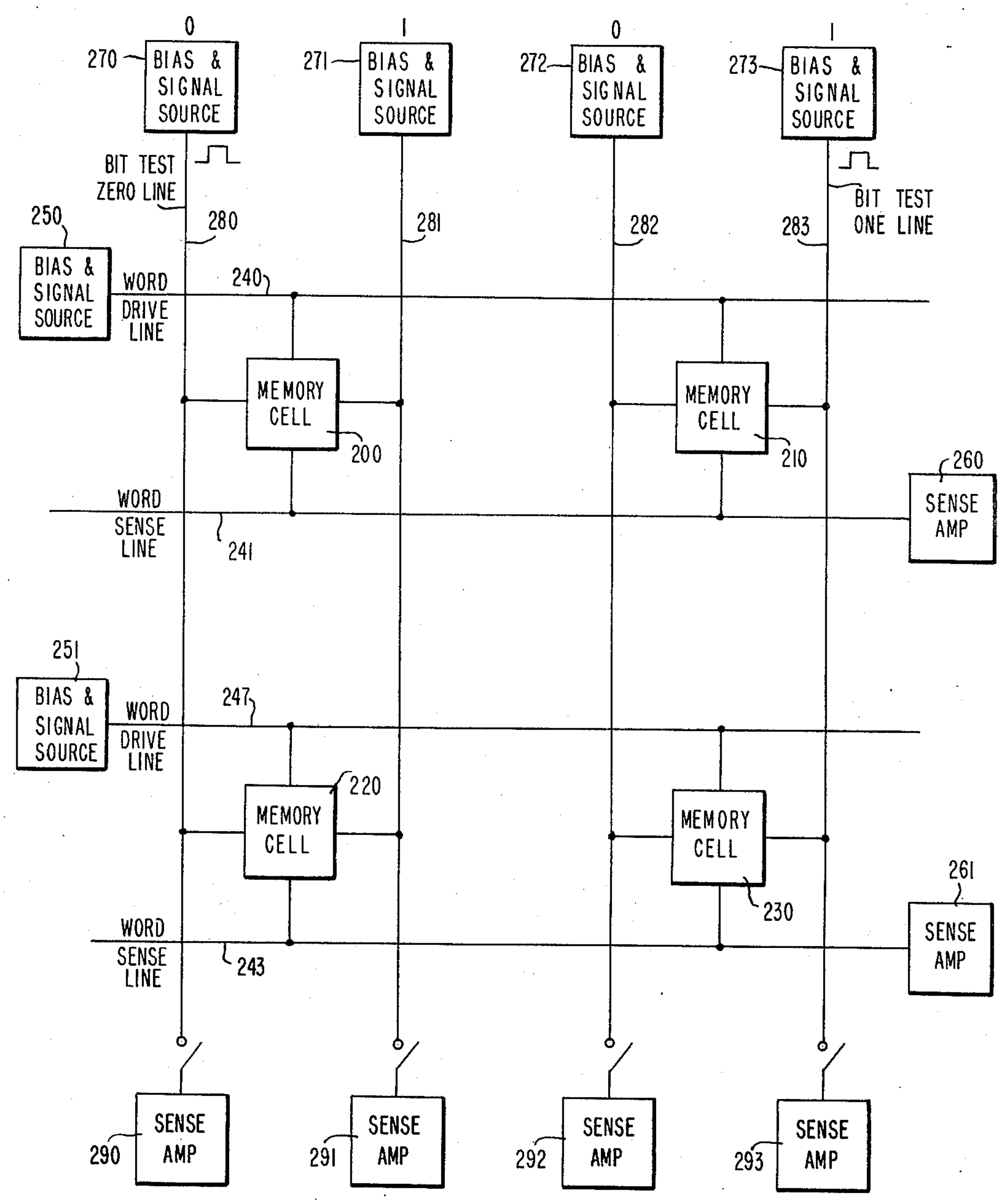
FIG. 3 is a block diagram of an associative memory matrix.

Referring now to FIG. 3, a 2 x 2 matrix comprising a plurality of memory cells 200, 210, 220, 230 is shown. These memory cells will preferably be of the type previously illustrated in FIG. 2, in which for improvement of response, the output stage 100 was added to the basic cell of FIG. 1. For convenience, in FIG. 3 separate word drive and word sense lines 240, 241, 242, 243 are shown connected at the top and bottom of the respective memory cells, and signal sources 250 and 251, similar in all respects to the previously discussed sources, are connected to the word drive lines 240 and 242 respectively. Sense amplifiers 260 and 261 are shown connected to the word sense lines 241 and 243. Bias and signal sources 270, 271, 272 and 273 are shown connected to the bit test lines 280, 281, 282 and 283 respectively. At the other end of these lines there are shown several sense amplifiers, for the purposes previously indicated and these are designated 290, 391, 292 and 293.

Let it be assumed that an associative search is to be performed utilizing the 2 x 2 matrix, such as shown in FIG. 3, and let it further be assumed that memory cell 200 is storing a "1," memory cell 210 a "0," memory cell 220 a "0" and memory cell 230 a "1." Now, if the desired or test word is 10, a pulse will be applied along the "bit test 1" line in the first column of the matrix (on the left). This pulse is supplied by source 271 on line 280 and simultaneously therewith a pulse will be supplied from source 272 along the "bit test 0" line. Since, as has been noted, memory cell 200 is in fact storing a "1" and memory cell 210 is storing a "0," a match will be found in both instances. Therefore, there will be no spike of voltage appearing on the word sense line 241 and no signal will be detected by the sense amplifier 260. However, in both instances of memory cells 220 and 230 there is a mismatch since cell 220 is storing a "0" at this time and cell 230 a "1." This condition will be detected and sensed by amplifier 261. Of course, a single mismatch would have occurred if either the memory cell 220 or 230 provided the mismatch; that is, if a "0" was being stored in cell 220 and cell 230, or if both cells were storing ones.

Unlike many previously proposed associative memory systems, the present invention permits the simultaneous interrogation or testing of all the bit positions in a word of interest regardless of the information in each bit position. It is not necessary to interrogate separatively for zeros and ones. In other words, the complete test word is searched for in a single step.

In addition to the performance of an associative memory search, the more conventional read and write operations, as previously discussed with reference to the single cell of FIG. 1, are also performable with the array of FIG. 3. In this connection, it should be noted that information may be written into selected bits of selected words without disturbing other bits of the same words. Thus, selective writing into one of the memory cells of the array of FIG. 3 is accomplished simply by applying a pulse from the appropriate source 250 or 251 to the respective word drive line 240 or 242 and in the case of writing a "1" into either the cell 200 or 220, by applying coincidently a pulse from source 270. The nondestructive character of the conventional read out has, of course, also been retained with the matrix arrangement of FIG. 3.

The memory matrix of FIG. 3 also provides the additional feature of "up dating" by reason of the fact that different memory cells corresponding to different bit positions in the same word may be written into and read out simultaneously. Consider, for example, memory cells 200 and 210. If it is desired to read out information from cell 200 and at the same time to write in new information into cell 210, the word drive line 240 has a pulse applied to it from source 250. The present state of the memory cell 200 is detected by sense amplifier 280 or sense amplifier 281 depending on whether the memory cell 200 has a "0" or a "1" stored therein. Of course, it will be understood by those skilled in the art, that in some applications only one sense amplifier would be required.

A pulse is also applied down the word drive line to the emitter side of memory cell 210, and if simultaneously therewith a pulse is applied from source 272 on the bit test "0" line, a "1" will be written into memory cell 210.

There has been described herein a unique memory cell and an associative memory system in which the cell is adapted to be utilized. This cell and the memory system are readily implementable in great numbers within a single monolith or block of semiconductive material.

The cell and system of the present invention have many notable attributes among which are selective writing, nondestructive read out of the information stored therein the ultimate in simplicity of design of the cells, each of which has as few as two transistors and three resistors. In addition, the system has very low power requirements and is capable of high speed associative memory searching.

Although for clarity and ease of understanding a simplified memory cell system has been described herein, it will be understood that more complicated and sophisticated systems are also contemplated by the present invention, and that many modifications of the basic system will occur to those versed in the art. For example, a multiple write feature may be incorporated into the memory system. Such a multiple write feature involves the ability to tag many selected words with the same marker bit or bits. Thus, in some applications, it is desirable to mark or label simultaneously a number of selected words without disturbing the rest of their content. This may be done by sensitizing all the selected words and simultaneously pulsing the appropriate bit drivers connected to the marker bit positions of every word.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A memory cell comprising a pair of three terminal solid state devices, a first terminal of each of said devices being directly connected to a second terminal of the other device, a load resistor for each of said devices and a common resistor connected to the third terminals of said devices;

said memory cell having two quiescent states, a first state in which one of said devices is conductive and the other is nonconductive, and a second state in which the other is conductive and the one is nonconductive;

means for controlling the quiescent state of said memory cell, said means including a first signal source connected to said common resistor and a second signal source connected to the first terminal of one of said devices, said first and second signal sources being operative coincidently to control the quiescent state;

means for testing said cell to determine if the information present therein matches a test bit of information comprising said second signal source connected to the first terminal of one of said devices, and a third signal source connected to the first terminal of said other device;

said memory cell being responsive to either of said second and third signal sources to vary the current flow in the device other than the one to whose first terminal said second and third source is respectively connected, and means connected to the third terminal of both of said devices for sensing said variation in current flow.

2. A memory cell comprising a pair of transistors having their collectors and bases directly cross-coupled, a load resistor for each of said transistors and a common emitter resistor, said memory cell having two quiescent states, a first state in which one of said transistors is conductive, and the other is nonconductive, and a second state in which the other is conductive and the one is nonconductive;

means for controlling the quiescent state of said memory cell, said means including a first signal source connected to said common emitter resistor and a second signal source connected to the collector of only one of said transistors, said first and second signal sources being operative coincidently to control the quiescent state;

means for testing said cell to determine if the information present in said cell matches a test bit of information comprising said second signal source, connected to the collector of one of said transistors, and a third signal source connected to the collector of said other transistor;

said memory cell being responsive to either of said second and third signal sources to vary the current flow in the transistor other than the one to whose collector said second and third source is respectively connected, and means connected to the emitters of both of said devices for sensing said variation in current flow.

3. A memory cell comprising a pair of transistors having their collectors and bases directly cross-coupled, a load resistor for each of said transistors and a common emitter resistor;

said memory cell having two quiescent states, one of which is defined as the storage of a "0" and the other is defined as the storage of a "1," said states corresponding to conductive and nonconductive states for each of said transistors;

a plurality of sources for providing quiescent bias and signals to each of said transistors, a first of said sources being connected in common to the emitters of both of said transistors, a second source being connected to the collector of one of said transistors, a third source being connected to the collector of the other transistor;

a plurality of sense means connected respectively to the collector of the first transistor, the collector of the second transistor, and in common to the emitters of both transistors;

either of said first or second signal sources being operative coincidently with said third signal source to write information in the form of a "0" or a "1" into said memory cell;

said first signal source being operative alone to vary the current flow in the conductive one of said transistors;

said second and third sources each being operative alone to compare a test bit of information with a stored bit to determine whether a match or mismatch exists.

4. A memory cell comprising first and second transistors having their collectors and bases directly cross-coupled, a load resistor for each of said transistors and a common emitter resistor, a third transistor having its base connected to the emitters of said first and second transistors and to said emitter resistor;

said memory cell having two quiescent states, one of which is defined as the storage of a "0" and the other is defined as the storage of a "1," said states corresponding to opposite conductive states for said first and second transistors;

a plurality of sources for providing quiescent bias and signals to said first and second transistors, a first of said sources being connected in common to the emitters of said first and second transistors, a second source being connected to the collector of said first transistor, a third source being connected to the collector of said second transistor;

a plurality of sense means connected respectively to the collector of the first transistor to the collector of the said second transmitter and to the emitter of said third transistor;

either of said second and third sources being operative coincidently with said first signal source to write information in the form of a "0" or a "1" into said memory cell;

said first signal source being operative alone to vary the current flow in the conductive one of said first and second transistors;

said second and third sources each being operative along to compare a test bit of information with a stored bit to determine whether a match or mismatch exists.

5. An associative memory system comprising a plurality of memory cells, each cell comprising a pair of transistors and each cell correpsonding to a bit of information in a data word;

at least three lines connected to each of said cells, a firt of said lines being connected to each memory cell corresponding to a bit position in a single predetermined data word, second and third lines being connected to the memory cells corresponding to the same bit positions in each of a plurality of data words;

first, second and third bias and signal sources respectively connected to said first, second and third lines, said first source being operative coincidently with either said second or third source to write information selectively into any one of said memory cells and, means for testing each of said cells to determine if the information present matches a test bit of information, said means comprising said second signal source connected to said second line and a third signal source connected to said third line;

each of said memory cells being responsive to either of said second and third signal sources to vary the current flow in the transistor other than the one to whose collector said second and third line is respectively connected and, means connected to said first lines for sensing said variation in current flow.

6. An associative system comprising a plurality of memory cells, each cell comprising a pair of transistors and each cell corresponding to a bit of information in a data word;

at least three lines connected to each of said cells, a first of said lines being connected to each memory cell corresponding to a bit position in a single predetermined data word, second and third lines being connected to the memory cells corresponding to the same bit positions in each of a plurality of data words;

first, second and third bias and signal sources respectively connected to said first, second and third lines, said first source being operative coincidently with either said second or third source to write information selectively into any one of said memory cells;

means for simultaneously testing a plurality of said cells to determine if the information present therein matches a test word, said means comprising a plurality of said second and third bias and signal sources, each of said memory cells being responsive to either of said second and third signal sources to vary the current flow in the transistor other than the one to whose collector said second and third source is respectively connected and, means connected to said first lines for sensing said variation in current flow.

References Cited

UNITED STATES PATENTS 3,218,613 11/1965 Gribble ------------ 340—173

TERRELL W. FEARS, Primary Examiner

U.S. Cl. X.R.

307—238; 340—172.5

CERTIFICATE OF CORRECTION

Patent No. 3492661 Dated January 27, 1970

Inventor(s) Wilbur D. Pricer

It is certified that error appears in the above-identified patent and that said Letters Patent are hereby corrected as shown below:

In the specification, column 1, line 71, "No. 2196" should be -- No. 2, 106 --.

column 2, line 59, "positons" should be -- positions --;

column 6, line 62, "391" should be -- 291 --;

In the claims, Claim 4, column 9, line 41, "opposite" should be -- oppositely --;

" " line 52, after "second" change "transmitter" to -- transistor --;

Claim 5, column 10, line 2, "correpsonding" should be -- corresponding --;

column 10, line 5, "firt" should be -- first --;

Claim 6, column 10, line 28, after "associative" insert -- memory --.

SIGNED AND SEALED

JUL 7 1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. 3492661 Dated January 27, 1970

Inventor(s) Wilbur D. Pricer

It is certified that error appears in the above-identified patent and that said Letters Patent are hereby corrected as shown below:

Claim 3, line 21, delete "first or second" and insert -- second or third --; line 22, change "third" to -- first --.

Signed and sealed this 3rd day of Nov. 1970

(SEAL)
Attest:

Edward M. Fletcher, Jr. November 3, 1970
Attesting Officer

WILLIAM E. SCHUYLER, JR.
Commissioner of Patents